June 6, 1967     D. E. ESCHE     3,323,828
RUMBLE SEAT ATTACHMENT FOR AUTOMOBILE TRUNK
Filed July 19, 1965     2 Sheets-Sheet 1

INVENTOR
DELBERT E. ESCHE

BY *Allen M Kraus*
ATTORNEY

June 6, 1967 D. E. ESCHE 3,323,828
RUMBLE SEAT ATTACHMENT FOR AUTOMOBILE TRUNK
Filed July 19, 1965 2 Sheets-Sheet 2

INVENTOR
DELBERT E. ESCHE

BY
ATTORNEY

United States Patent Office 3,323,828
Patented June 6, 1967

3,323,828
RUMBLE SEAT ATTACHMENT FOR
AUTOMOBILE TRUNK
Delbert E. Esche, 34446 Marquette,
Wayne, Mich. 48184
Filed July 19, 1965, Ser. No. 472,808
8 Claims. (Cl. 296—63)

This invention relates to an auxiliary seat formed in the trunk of an automobile and more particularly to such a seat which is adapted to be installed on existing vehicles.

Automobiles having rumble seats enjoyed popularity during the 1920's and 1930's but have completely disappeared because of the requirements of modern styling and the desirability of providing a car with a trunk of large proportions. Still, the advantages of the rumble seat, that is the provision of seating capability in excess of normal capacity of a car and the physical enjoyment which is associated with riding in an open car section, are such as to make a rumble seat type arrangement desirable if it can be done within the confines of modern styling and without appreciably decreasing the automobile's trunk capacity. The present invention contemplates such a seat arrangement which not only meets these two criteria but is also simple in construction so as to be low in cost and is easily applied to existing auto structures.

The present invention broadly consists of a section which may be attached to the center of the trunk lid of an existing vehicle and provides a cover section for a central opening in the lid, which cover section may be disposed in either a first, closed position, wherein it provides a weather-tight seal for the opening and is relatively unobtrusive, or a second, open position wherein it uncovers the opening and forms a back-rest for occupants of the auxiliary, or rumble seat.

As subsequently disclosed in the description of a preferred embodiment of the invention, a hole is first formed in the center of the trunk lid generally approximating the shape of the seat cover, which is preferably rectangular. An elongated, flat strip or molding is then disposed about the interior of the hole, preferably by welding, so that it extends both above and below the hole and acts as a liner for the hole. In this manner any roughness in the hole or the weld is shielded from the inside of the hole. A portion of this edging which extends above the lid acts as a frame for the retention of a lid cover. The lid cover has a framing section which is formed complementary to and larger than the lid frame and is adapted to slip over the lid frame and abut the surface of the lid around the central hole so as to hide the connection between the hole edging and the lid. This lid frame extends normally to the surface of the lid and is disposed in abutment with and exteriorly of the edging frame. At its upper side, above the level of the edging frame, it supports a flat surface which extends normally to the frame and thus generally parallel to the trunk lid surface. This upper surface in turn has a central rectangular aperture that may be closed by a cover that is pivotable between a closed position and an open position wherein it forms a back-rest. The edge surface between this cover and the flat surface is formed in a novel manner to create a simple and effective fluid seal between the two units when the cover is in a closed position. The unit is completed by a cushion which may be loosely supported on the trunk bottom and acts as the seat cushion for the vehicle. The occupant's legs may be inserted into the trunk space forward of the cushion.

Aside from the basic advantages which accrue to the provision of an auxiliary seat in the vehicle the present invention provides such a seat which may be prefinished at the factory and may be adapted to a trunk surface independently of the contour of the trunk lid in a simple manner which is designed to hide the permanent connections made between the trunk lid and the apparatus so that they may be formed by unskilled persons. A variation of the trunk lid has a vertical stop which rises above the cover lid, when the cover is in a closed position, and acts as a luggage rack and as a stop for luggage disposed on top of the lid.

It is therefore seen to be a primary object of the present invention to provide an auxiliary seat adapted to be disposed in the generally horizontal trunk lid of a vehicle which consists of a cover member adapted to close an aperture in the lid when in one position and to incline upwardly from the lid so as to form a back-rest when in another position.

Another object of the present invention is to provide such an auxiliary seat which includes a generally vertical edging member that is attached to the interior of an aperture formed in the trunk lid and extends above and below that aperture to act as a frame for the reception of a pivotable cover member which may cover the aperture.

Another object is to provide such an auxiliary seat wherein the cover member attaches to the trunk lid so as to form a waterproof joint with a minimum of flexible sealing or other conventional sealing devices.

A still further object is to provide such an auxiliary seat wherein the visible portions of the seat member may be prefinished at the factory and are adapted to be fitted to the trunk lid without regard to the particular contour of the lid.

Other objects, advantages and applications of the present invention will be made apparent by the following detailed description of a preferred embodiment of the invention. The description makes reference to the accompanying drawings, in which.

Figure 1:
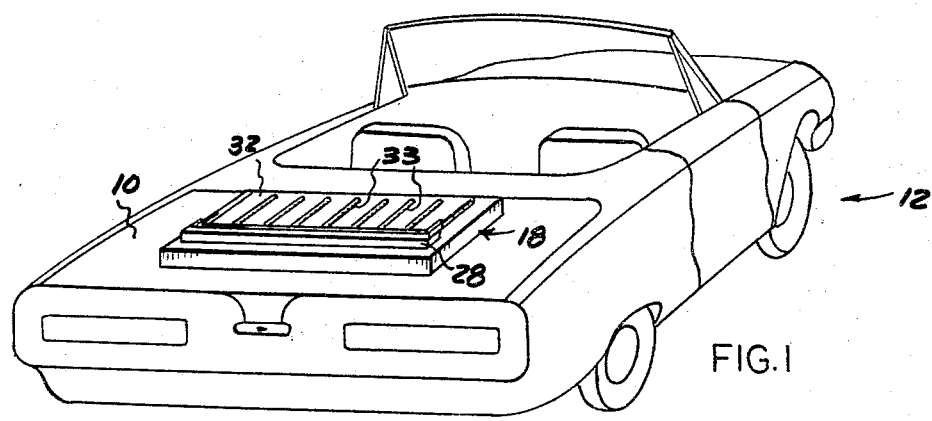
FIGURE 1 is a perspective view of an auxiliary seat representing a preferred embodiment of the present invention, formed in the trunk lid of a convertible automobile.

Referring to the drawings, an auxiliary seat constituting the preferred embodiment of the invention is intended to be applied to the trunk lid 10 of an automotive vehicle generally indicated at 12. While the vehicle illustrated in FIGURE 1 is a convertible, the auxiliary seat could just as easily be applied to a sedan or other closed body style. From the standpoint of the invention the only requirements for the car is that it have a trunk lid with a general surface that is not inclined too greatly with respect to the horizontal. All current model automobiles with trunks completely satisfy this requirement.

As a first step in fitting a preferred embodiment of the present invention to the trunk lid 10, a rectangular aperture 14 is formed in the center of the lid. This aperture may be formed by sawing the lid, and any underlining which the lid may have, and while the outline of the hole should closely conform to the outline of the frame which will be subsequently mounted thereon, the edges of the hole need not be highly finished nor need the appearance of the hole be given prime consideration.

Following the formation of the hole, an elongated strip of steel edging 16 is joined about the perimeter of the closed hole 14 as by welding. The exterior of the closed strip is welded to the perimeter of the hole 14 so that the lid meets the edging 16 between the long sides of the edging, and the edging extends both above and below the lid surface. In the preferred embodiment, the edging 16 extends below the hole far enough to cover the cut ends of any under deck lid framing members and above the hole enough to give a continuous lip upward from the deck surface which distance will vary from point to point on the periphery of the hole depending on the contour of the particular deck lid. The edging should extend substantially normally to the adjacent lid surface.

A cover frame, generally indicated at 18, is then fitted over the edging 16. The frame 18 includes a closed rectangular mating strip 20 which has inner dimensions similar to but sufficiently larger than the outer dimensions of the edging strip frame so that a gasket 23 of rubber or other plastic material may be inserted between the mating strip 20 and the upward extending section of the edging strip 16. The mating strip 20 has a finished bottom edge 21 and a depth which is slightly greater than the extension of the edging 16 above the surface of the deck 10.

Figure 5:
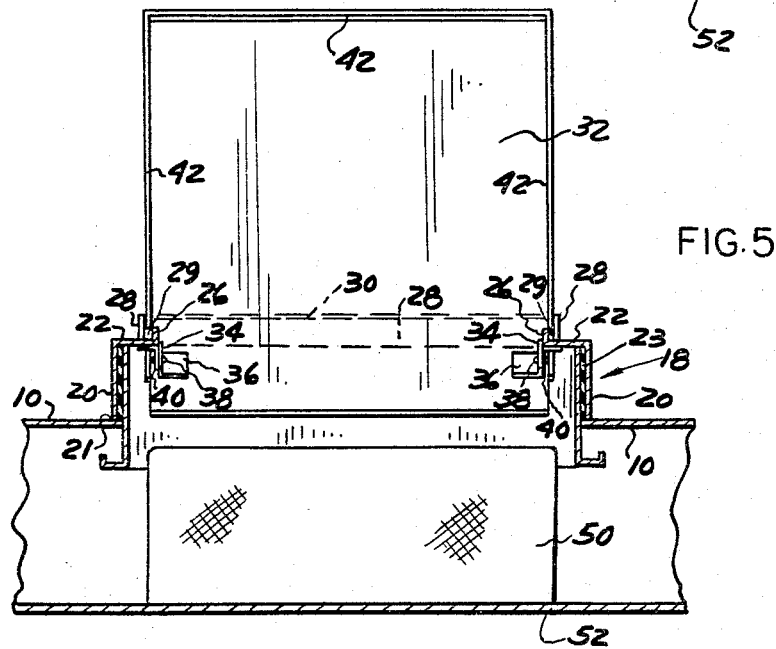
FIGURE 5 is a transverse sectional view of the cover in the position of FIGURE 4, taken along line 5—5 of FIGURE 4.

At the upper end of the mating strip 20 the frame 18 is flanged inwardly so as to form a flat, top deck surface 22. A central opening 24 is formed in the center of the cover within the deck 22. This center opening is framed by a pair of upwardly extending flanges formed at the inner perimeter of the deck 22. A forward flange 26 is formed entirely along the forward edge of the opening 24 and along the major portions of the two side openings in the deck terminating about one-fifth of the length of the sides of the opening 24 from the rear edge of the deck. A rear flange 28, slightly higher than the forward flange 26, extends along the entire length of the rear side of the opening 24 and forward along the sides of the opening about one-fifth of the length of the sides, terminating adjacent to the rear termination of the forward flanges 26. As is best seen in FIGURE 5 the side portions of the rear flange 28 are spaced wider than the side portions of the forward flange 26 and the opening 24 is wider between the edges of this rear flange. A space is thus created between the interior sides of the rear flange 28 and the outer sides of the forward flange 26, across the width of the seat. A short transversely extending section 29, having the height of the forward flange 26 extends vertically between the rearward edges of the side portions of the forward flange 26 and the forward edges of the side portion of the rear flanges 28. The rear flange 28 has an inwardly extending top section 30 along only its rear edge.

Figure 2:
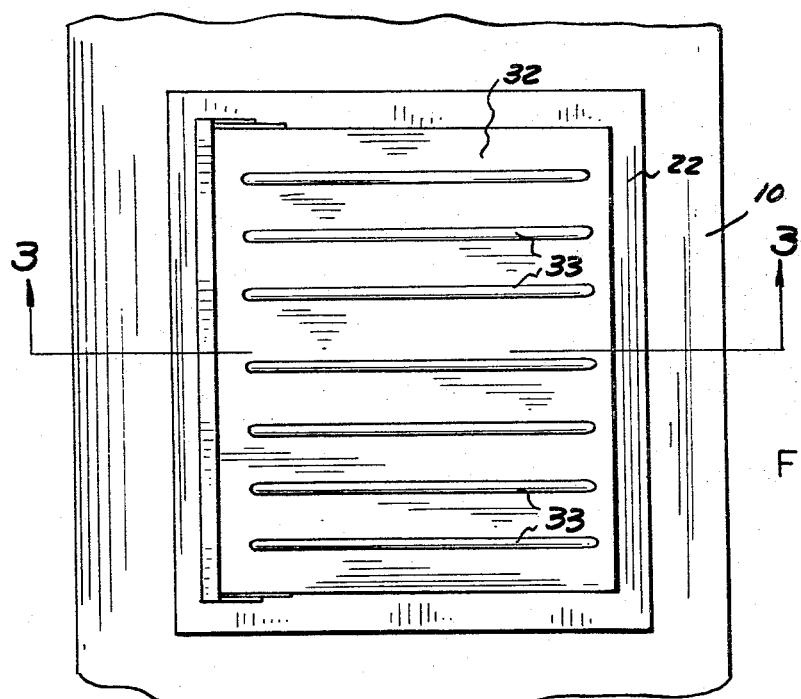
FIGURE 2 is a top view of the auxiliary seat and the surrounding area of deck lid.
Figure 3:
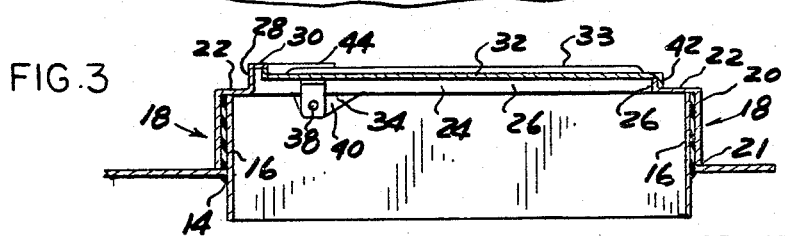
FIGURE 3 is a transverse sectional view through the auxiliary seat and the surrounding deck lid taken along lines 3—3 of FIGURE 2.
Figure 4:
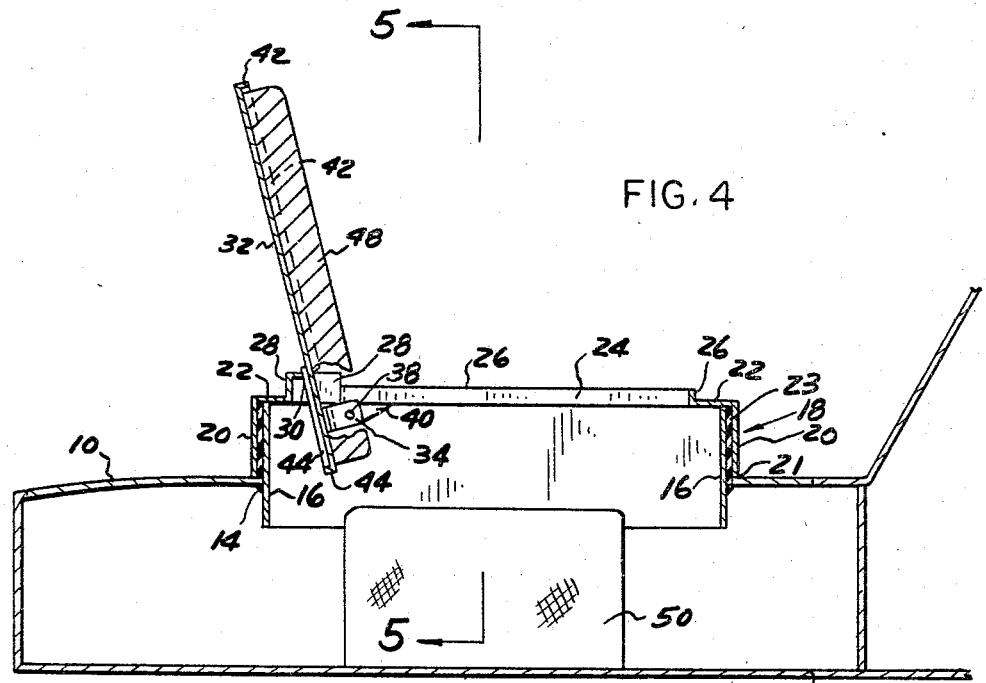
FIGURE 4 is a longitudinal sectional view of the auxiliary seat and the surrounding deck lid, with the seat cover in an open position.

A cover member having a flat surface 32 is pivotably supported within the opening 24 and may be pivoted between the open position, shown in FIGURES 4 and 5, wherein it forms a back-rest, or in a closed position shown in FIGURES 1–3, wherein it covers the opening 24. The cover 32 has the same general shape as the opening 24. It is pivoted on a pair of downwardly extending flat hinge plates 34 which are positioned parallel to one another, adjacent to, and spaced slightly inwardly from the sides of the cover 32 near its rear end. The hinge plates 34 are attached to the cover 32 by right angle sections 36 which are welded to the underside of the cover 32. A pair of pins 38 pass through holes in the centers of the hinge plates 34 and pivotably attach the plates to downwardly extending hinge sections 40 positioned below and in line with the rearward edges of the forward flanges 26.

The cover 32 has a plurality of indented ribs 33 formed on its upper side which may act as luggage rack supports. The cover 32 has a downwardly turned forward flange 42 which runs about its forward edge and extends rearwardly along its sides through the major part of the length of the sides. It terminates at a point separated from the end of the cover 32 by about the same distance that the forward flange 26 of the frame extends short of the end of the frame side. The depth of the forward cover flange 42 is about the same as the depth of the forward frame flange 26 and the inner dimensions of the forward cover flange are complementary to the outer dimensions of the forward frame flanges so that when in a closed position the forward cover flange extends over the forward frame flange.

The cover also has an upwardly extending rear flange 44, formed across the entire width of its rear side and along the rear portion of its sides to a point forward of the point of termination of the forward flange 42.

When the cover is in a closed position, as shown in FIGURES 1–3, the forward cover flange 42 extends over the forward frame flange 26 so that moisture cannot effectively pass between them into the trunk. It might also be desirable to use a compressible gasket material on their abutting the edges to perfect the seal. In the closed position the upper edge of the rear portion of the rear cover flange 44 abuts the forwardly extending section 30 of the rear frame flange 28, as is best seen in FIGURE 3. This also forms a moisture resistence seal. Water falling on the cover 32 is channeled by the flange 44 to the forward section of the cover and falls off the cover over the seal between the flanges 26 and 42, effectively providing a weatherproof seal, without the necessity of, or with the use of minimum amount of compressible gaskets.

As is shown in FIGURE 4 a cushion 48 may be attached to the underside of the cover 32. When the cover is placed in the open position, shown in FIGURES 4 and 5, a stop is formed by the section 30 of the rear frame flange which abuts the top of the cover. This supports the cover at an obtuse angle with respect to the opening 24 and serves as a back-rest for an occupant of the auxiliary seat.

A seat cushion 50 is supported on the bottom 52 of the trunk for the use of an occupant of the auxiliary seat.

The entire cover section and frame 18 may be prefinished at a factory and marketed so that the purchaser may install the framing strip 16 with a minimum of mechanical facilities. The cover may be adapted to any trunk independent of the contour of the trunk and only the finished cover section is visible when in use.

It is thus seen that the present unit may be simply installed and provides a comfortable auxiliary seat while only decreasing the volume of the trunk by the space taken up by the seat cushion 50 and part of the back-rest cushion 48.

Having thus described my invention, I claim:

1. An auxiliary seat for an automobile having a trunk with a generally horizontal lid, comprising: an opening formed in the lid; an edge member attached to the opening in the lid and extending above the surface of the lid, normally to the surface; a cover frame member having an enclosed mating strip with an inner configuration complementary to the outer configuration of the edge member, adapted to extend over the edge member, and a top side having a central opening therein; a planar cover member having an outer configuration complementary to the opening in the cover frame; hinge means for supporting said cover member within the cover frame for motion between a closed position, wherein it seals the opening in the cover frame, and an open position wherein it extends upwardly from said cover frame at an inclination with respect to the vertical; and a seat member supported on the lower surface of the trunk below the opening in the cover frame.

2. The seat of claim 1 wherein the edge member extends below the surface of the opening in the trunk lid as well as above the surface.

3. The seat of claim 1 wherein the cover member is hinged for motion within the cover frame about an axis which extends transversely to the longitudinal axis of the automobile and is located adjacent to the rear end of the cover.

4. The seat of claim 3 wherein the opening in the cover frame has an upturned flange extending about its entire perimeter, and the cover member has a downturned flange around at least a portion of its perimeter which mates with the upturned flange when the cover is in a closed position in order to form a weather-tight seal.

5. An auxiliary seat for an automobile having a trunk with a generally horizontal lid, comprising: an opening in the lid which is generally rectangular in shape, is aligned with a longitudinal axis of the car and has an enlarged section at the rear side which is wider than the width along the main length; a first upturned flange on the perimeter of the aperture in the lid forward of the widen section, and a second upturned flange around the perimeter in the opening in the lid to the rear of the upturned section; short transverse upturned connecting flanges joining the rear end of the first upturned flange to the forward ends of the second upturned flange; a cover member pivotably supported within the aperture in the lid for rotation about an axis which extends transversely across the width of the aperture approximately at the forward termination of the widen portion; and a downturned flange extending around the perimeter of the cover forward of the hinge, which downturned flange is operative to engage with the first upturned flange on the lid to form a seal when the lid is in a closed position.

6. The seat of claim 5 wherein the cover includes an upturned flange extending around the perimeter to the rear of the hinge so that precipitation falling on the cover is channeled to the forward portion which is sealed with the first upturned flange.

7. The structure of claim 5 wherein the aperture in the lid is formed in a cover frame which is attachable to and removable from the lid.

8. An auxiliary seat for an automobile having a trunk with a generally horizontal lid, comprising: a rectangular opening formed in the lid; an edge member attached to the opening in the lid and extending above the surface of the lid, normally thereto; a cover frame member having a planar surface of dimensions similar to those of the opening in the lid and having a closed mating strip extending about the edges of the frame member, normally to the surface thereof, said mating strip having inner dimensions complementary to the outer dimensions of the edge member attached to the opening in the lid and being adapted to extend over such edge member; a generally rectangular aperture formed in the cover frame member; a planar cover member having an outer configuration complementary to the opening in the cover frame; and hinge means for supporting said cover member within the cover frame, for pivotable motion about an axis parallel to the surface thereof between a closed position, wherein it seals the opening in the cover frame, and an open position wherein it extends upwardly from said cover frame at an inclination with respect to the vertical.

References Cited
UNITED STATES PATENTS

| | | | |
|---|---|---|---|
| 1,654,878 | 1/1928 | Holler et al. | 296—66 |
| 1,751,378 | 3/1930 | Zaiden | 296—66 |
| 1,806,692 | 5/1931 | Lemon | 296—66 |
| 2,806,626 | 9/1957 | Nyden | 220—31 |
| 3,142,847 | 8/1964 | Kurrels | 220—32 |

BENJAMIN HERSH, *Primary Examiner.*

J. H. BRANNEN, *Assistant Examiner.*